June 21, 1932. C. MARK, JR 1,864,139
APPARATUS FOR BUTT WELDING
Filed June 5, 1929  2 Sheets-Sheet 1

INVENTOR
Clayton Mark Jr
BY
Clarence D Kerr
ATTORNEY

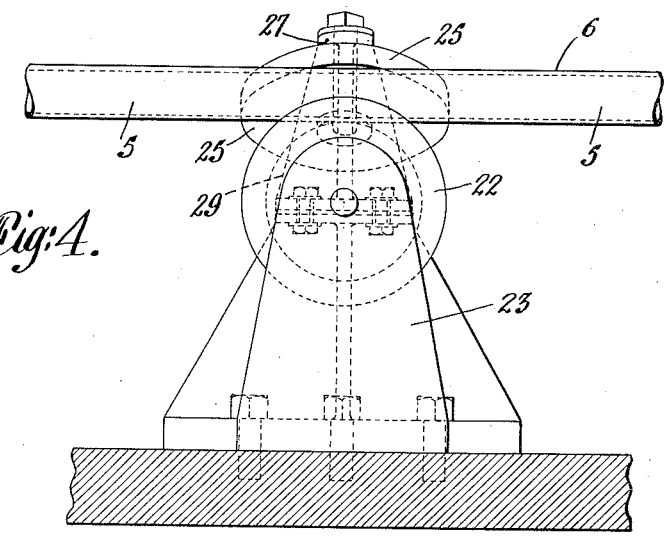
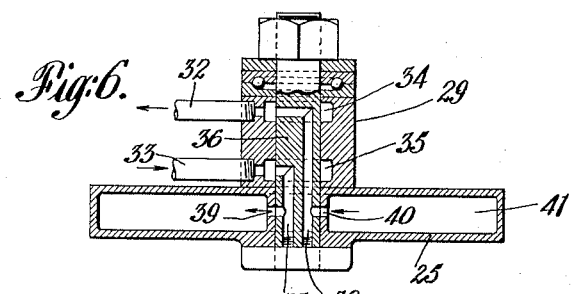
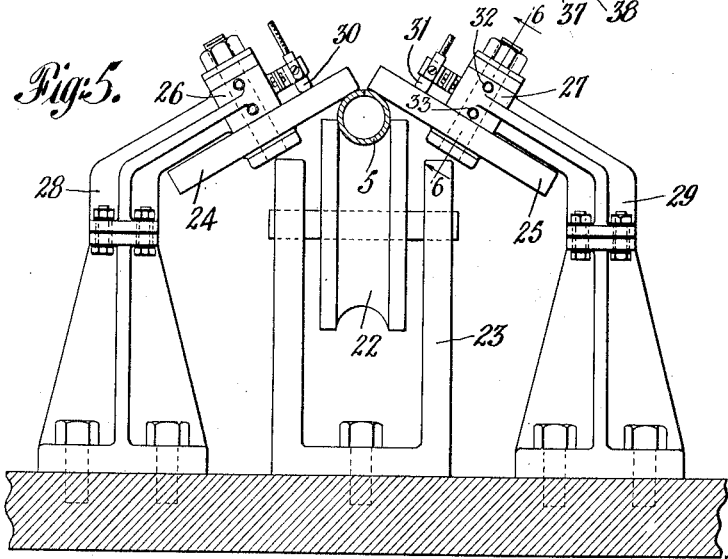

Patented June 21, 1932

1,864,139

UNITED STATES PATENT OFFICE

CLAYTON MARK, JR., OF CHICAGO, ILLINOIS, ASSIGNOR, BY MESNE ASSIGNMENTS, TO CLAYTON MARK & COMPANY, OF CHICAGO, ILLINOIS, A CORPORATION OF DELAWARE

APPARATUS FOR BUTT WELDING

Application filed June 5, 1929. Serial No. 368,450.

This invention relates to alternating current welding and is particularly adapted to high speed production of butt-welded tubing. As heretofore commonly practiced, the art of butt-welding tubing by alternating current has been largely based upon the disclosure of the patent to Parpart, No. 658,741, Sept. 25, 1900. For a long time, the rate of tube production was in the neighborhood of 15 or 20 feet per minute, the commercially available alternating current of a frequency of 60 cycles per second being employed. Later, the rate of production was increased to around 60 or 70 feet per minute, but such rate, in conjunction with the customary 60 cycle current, was found to result in a "recurrent" or "stitch" weld, such as is mentioned in the patent to Johnston, No. 1,388,434, Aug. 23, 1921. Such weld exhibits recurrent variations synchronous with the current fluctuations, points of maximum weld (corresponding to maximum current flow) alternating with points of minimum weld (corresponding to zero flow). This recurrent or "stitch" characteristic of the weld becomes more pronounced in proportion with the speed of travel of the tube stock. Various attempts have been made to attain speeds of production in the neighborhood of 60 or 70 feet per minute, or higher, and at the same time to obtain a continuous or uniform, as distinguished from a "stitch," weld. One endeavor to solve the problem consisted, as set forth in the patent to Pancoast, No. 1,544,272, June 30, 1925, of increasing the current frequency from 60 to 300 cycles per second; thus substantially increasing the number of maximum current values occurring in each unit of time. This, however possesses the disadvantage of requiring special sources of current supply. Other solutions of the problem have been proposed but these likewise require special equipment.

I have devised a method and apparatus whereby a continuous or uniform weld may be obtained at the desired higher rates of tube travel and with the commercially available 60-cycle current. In carrying out my invention I cause the current to travel across the seam in a path having substantial width and extending over a substantial length of the seam. In the apparatus heretofore employed, as exemplified by the patents above mentioned, the electrodes for applying current across the seam are in the form of rollers contacting with the surface of the tube stock on opposite sides of the seam, but such contact is effected only along a line extending transversely of the seam. I provide for contact of the electrodes with the tube stock along lines extending longitudinally of the seam, so that the current, at any instant of flow, travels across a substantial length of seam. In this way successive points on the seam may be subjected to a cumulative heating effect resulting from the varying current values as each such point travels across the path or zone through which the current is flowing. Moreover, by causing the tube stock to travel at an appropriate rate with respect to the width of the zone of current flow and to the frequency of the current each of a continuous series of successive points through any desired seam length may readily be subjected to the heating effect of at least one maximum value of the current or to as many such maxima as desired. It will thus be apparent that my invention provides for the attainment of a continuous weld even at very high rates of travel of the stock, and with alternating current of the standard frequency of 60 cycles per second.

In the accompanying drawings, wherein I have illustrated apparatus suitable for carrying out my invention:

Fig. 4 is a side elevation of a modified form of welding means.

Fig. 5 is a front elevation of the apparatus shown in Fig. 4.

Fig. 6 is an enlarged sectional detail view taken on line 6—6 of Fig. 5, and

Fig. 7 is a detail view illustrating the extent of contact between the tube stock and the electrodes of Figs. 4 and 5.

Figure 1:
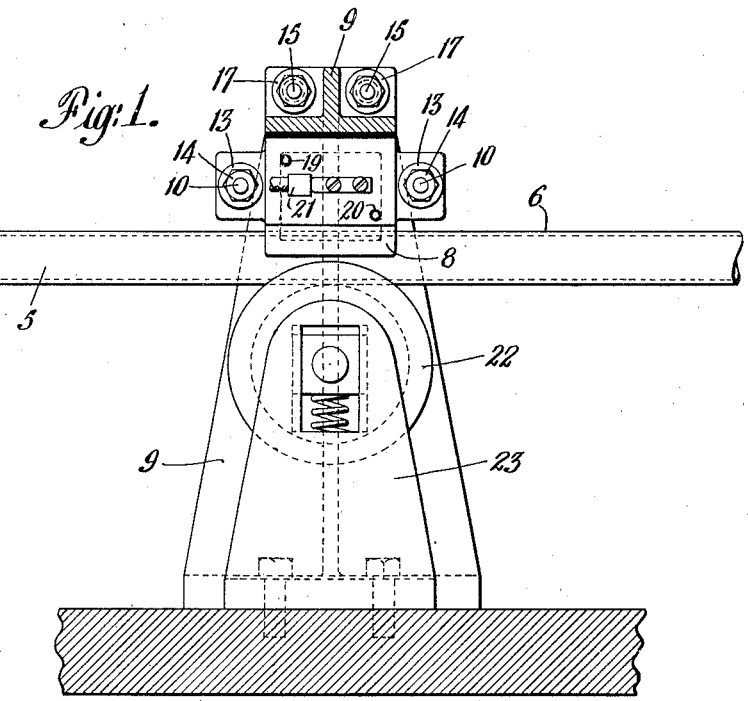
Fig. 1 is a view in side elevation of one form of welding means which may be employed.

Referring to the drawings, the numeral 5 designates the tube stock to be welded, the edges of said stock lying adjacent each other to form a seam 6. For applying current across the seam I may employ, as shown in Fig. 1, a pair of electrode elements in the form of shoes 7, 8, contacting with the stock on opposite sides of the seam. The shoes are shown extending lengthwise of the seam and since they are in contact with the stock along their length they provide a zone extending longitudinally of the seam for the passage of current thereacross. By varying the length of the shoes the width of the zone of current path may, of course, be changed as desired, so as to extend over desired lengths of seam.

The electrode shoes 7, 8, may be stationary and mounted in a suitable frame 9. As shown, said shoes are secured together by a bolt 10, a sheet of insulating material 11 being interposed between said shoes, and said bolt being surrounded by an insulating sheath 12 and the head and nut 14 on said bolt engaging insulating washers 13. A similar bolt 15, surrounded by a sheath 16 of insulating material and cooperating with insulating washers 17, 17, may be employed for securing the shoes to the frame 9. If desired, the shoes 7, 8, may be separate from each other and may be mounted in the supporting frame by separate bolts or other fastening means, the specific structure above described constituting but one example of a variety of constructions which may be employed. Each of the electrodes may be made hollow, as indicated at 18, for the reception of a cooling medium. Each chamber 18 may have connected thereto a corresponding pair of pipes 19, 20, for circulating a cooling medium therethrough. Current may be applied to the electrodes in any suitable way as through terminals 21.

Figure 3:
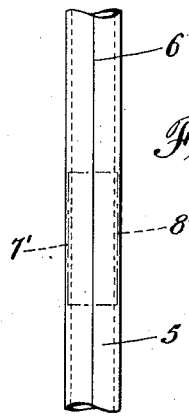
Fig. 3 is a detail view illustrating the extent of contact of the electrode shoes of Figs. 1 and 2 as applied to the tube stock.

The tube stock may be supported beneath the electrodes by a roller 22, mounted in a frame 23. In operation the tube stock is caused to travel between the electrodes and the supporting roller 22, and the current applied to the electrodes passes across the seam, thereby effecting the weld. Means for propelling the stock between pressure rollers and electrodes is well known in the art, is exemplified in the patents hereinbefore referred to, and need not be here described. The extent of contact of the electrode shoes with the stock is indicated at 7′, 8′ in Fig. 3, and the current flows across the seam in a corresponding zone extending longitudinally of the seam and defined by the length of the shoes. It will be apparent that as each point on the tube travels across said zone, said point will be subjected to the cumulative heating effect corresponding to the varying current values occurring throughout said zone during the transit of said point thereacross; and that each point may be subjected to any desired heating effect, depending on the rate of travel of the tube and the extent of the current zone. Since one hundred twenty maximum current values occur in each second when 60 cycle current is employed, it will be evident that even at very high rates of travel of the tube stock an effective, continuous, and uniform weld may be produced when a zone such as above indicated is utilized, in place of a line contact transverse of the seam as in the prior art constructions.

In Figures 4-6 an alternative form of welding apparatus is disclosed, such apparatus comprising welding electrodes in the form of rollers 24, 25 rotatable about inclined axes and contacting with the tube stock 5 on their lower sides. Each of said electrode rollers may be journaled for rotation in a corresponding bearing 26, 27 carried by a respective one of a pair of supporting arms 28, 29. Current may be lead to the respective electrode rollers 24, 25 through one or more brushes as indicated, for example, at 30, 31. If desired, the electrode rollers may be cooled, as, for example, in the manner indicated in Figure 6, wherein pipes 32, 33 communicate with annular recesses 34, 35 in the associated bearing, and wherein the shaft 36, which rotates in said bearing and on which the electrode roller is mounted, is provided with passages 37, 38 communicating with the respective recesses 34, 35. Said passages 37, 38 in turn communicate through apertures 39, 40 respectively with an interior annular chamber 41 in the electrode roller.

Figure 2:
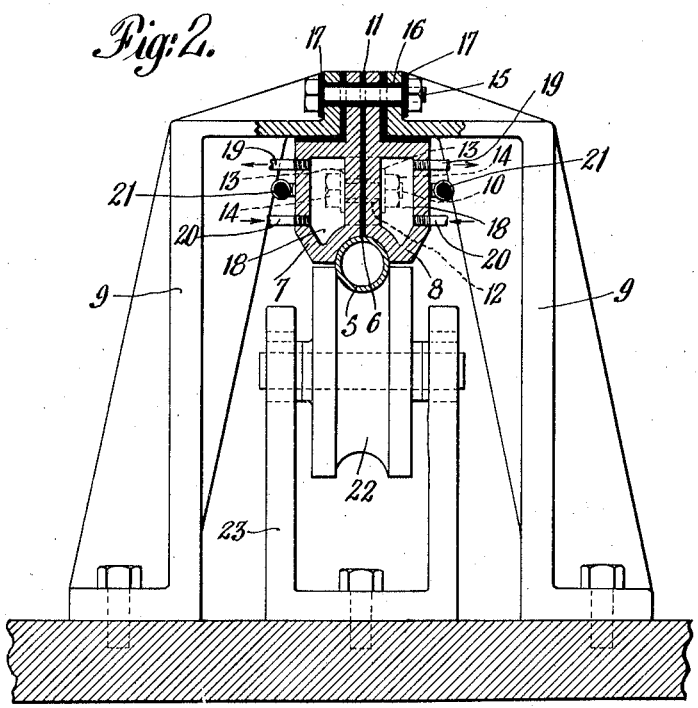
Fig. 2 is a view in front elevation, partly in section, of the apparatus shown in Fig. 1.

It will be seen that each of the electrode rolls 24, 25 contacts with the tube stock 5 along a line extending lengthwise of the seam, the respective lines of contact between said rolls and the stock being indicated at 26′, 27′ in Figure 7. Thus, these rollers, like the shoes 7, 8, provide a zone for the passage of current across the stem, said zone extending over a substantial seam length. The tube stock may be supported beneath the electrode rolls 24, 25 by a supporting roller 22 mounted in a frame 23 as in the apparatus shown in Figures 1 and 2.

The terms and expressions which I have employed are used as terms of description and not of limitation, and I have no intention, in the use of such terms and expressions, of excluding any mechanical equivalents of the features shown and described or portions thereof, but recognize that various structural modifications are possible within the scope of the invention claimed. It may be noted that while I have described my invention as pertaining particularly to welding by alternating current, it may also be applied to direct current welding, and that by providing for the flow of direct current across the seam in a zone extending lengthwise thereof each point on the seam may be subjected to a cumulative heating effect as it passes through said zone.

What I claim is:

1. In an apparatus for butt-welding metal tubing, a pair of electrodes on opposite sides of the seam for applying current thereto, and bearing means on which the respective electrodes are journaled for rotation, each of said electrodes having a plane surface engaging the tubing along a line extending longitudinally thereof and substantially parallel to the seam.

2. In an apparatus for butt-welding metal tubing, a pair of electrodes each comprising a circumferential portion and a plane face portion, and means supporting said electrodes for rotation, said electrodes being arranged on opposite sides of the seam to be welded and engaging the tubing with their face portions.

In testimony whereof I have signed my name to this specification this 25th day of May, 1929.

CLAYTON MARK, JR.